United States Patent
Raghavan et al.

(10) Patent No.: US 11,601,917 B2
(45) Date of Patent: Mar. 7, 2023

(54) BEAM SELECTION FOR CARRIER AGGREGATION IN MILLIMETER WAVE SIDELINKS

(71) Applicant: QUALCOMM Incorporated, San Diego, CA (US)

(72) Inventors: Vasanthan Raghavan, West Windsor Township, NJ (US); Sony Akkarakaran, Poway, CA (US); Jung Ho Ryu, Fort Lee, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/303,559

(22) Filed: Jun. 2, 2021

(65) Prior Publication Data

US 2022/0039064 A1 Feb. 3, 2022

Related U.S. Application Data

(60) Provisional application No. 62/706,066, filed on Jul. 30, 2020.

(51) Int. Cl.
*H04W 4/00* (2018.01)
*H04W 72/02* (2009.01)
(Continued)

(52) U.S. Cl.
CPC .......... *H04W 72/02* (2013.01); *H04B 7/0617* (2013.01); *H04W 72/046* (2013.01); *H04W 72/0453* (2013.01)

(58) Field of Classification Search
CPC ............. H04W 72/02; H04W 72/0453; H04W 72/046; H04B 7/0617; H04B 7/0695
(Continued)

(56) References Cited

U.S. PATENT DOCUMENTS 11,178,578 B2 * 11/2021 Huang ............... H04W 72/0446
2018/0027559 A1 * 1/2018 Iyer ....................... H04L 5/0058
370/329
(Continued)

FOREIGN PATENT DOCUMENTS

CA 3083302 A1 * 6/2019 ............. H04L 5/001
EP 3101962 A1 * 12/2016 ......... H04L 27/2607
(Continued)

OTHER PUBLICATIONS

NTT DOCOMO, TSG-RAN #54 Report. http://www.3gpp.org/ftp/information/presentations/presentations_2014/2014_06_LTE_Rel-12_and_beyond.pdf. Jun. 24, 2014. (Year: 2014).*
(Continued)

*Primary Examiner* — Thai D Hoang
(74) *Attorney, Agent, or Firm* — Harrity & Harrity, LLP

(57) ABSTRACT

Various aspects of the present disclosure generally relate to wireless communication. In some aspects, a user equipment (UE) may determine a set of frequency components to use in sidelink operation based at least in part on an inter-band carrier aggregation configuration. In some aspects, the set of frequency components includes one or more frequency components in a first frequency band and one or more frequency components in a second frequency band. The UE may communicate with another UE over a sidelink using one or more beams that are selected based at least in part on channel conditions associated with the one or more frequency components in the first frequency band and channel conditions associated with the one or more frequency components in the second frequency band. Numerous other aspects are provided.

30 Claims, 8 Drawing Sheets

(51) Int. Cl.
*H04B 7/06*      (2006.01)
*H04W 72/0453*   (2023.01)
*H04W 72/044*    (2023.01)

(58) Field of Classification Search
USPC .................................. 370/329–330, 335–345
See application file for complete search history.

(56) References Cited

U.S. PATENT DOCUMENTS

2018/0332564 A1* 11/2018 Lee .................. H04L 69/14
2019/0159150 A1*  5/2019 Nguyen .............. H04W 56/002
2022/0039064 A1*  2/2022 Raghavan ........... H04W 72/046
2022/0039191 A1*  2/2022 Raghavan ........... H04B 7/0695

FOREIGN PATENT DOCUMENTS

| WO | WO-2019074348 A1 * | 4/2019 | ............. H04W 4/40 |
| WO | 2019105394 A1 | 6/2019 | |
| WO | WO-2019105394 A1 * | 6/2019 | ............. H04L 5/001 |
| WO | WO-2022084372 A1 * | 4/2022 | |

OTHER PUBLICATIONS

Krause, Joern; "Future 3GPP RAN standardization activities for LTE"; http://www.3gpp.org/ftp/information/presentations/presentations_2012/2012_10_WWRF_future_standardization_LTE_JKrause.pdf. May 20, 2014. (Year: 2014).*

* cited by examiner

BEAM SELECTION FOR CARRIER AGGREGATION IN MILLIMETER WAVE SIDELINKS

CROSS-REFERENCE TO RELATED APPLICATION

This patent application claims priority to U.S. Provisional Patent Application No. 62/706,066, filed on Jul. 30, 2020, entitled "BEAM SELECTION FOR CARRIER AGGREGATION IN MILLIMETER WAVE SIDELINKS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for beam selection for carrier aggregation in millimeter wave (mmW) sidelinks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining a set of frequency components to use in sidelink operation based at least in part on an inter-band carrier aggregation configuration, wherein the set of frequency components includes one or more frequency components in a first frequency band and one or more frequency components in a second frequency band; and communicating with another UE over a sidelink using one or more beams that are selected based at least in part on channel conditions associated with the one or more frequency components in the first frequency band and channel conditions associated with the one or more frequency components in the second frequency band.

In some aspects, a UE for wireless communication includes a memory and one or more processors, coupled to the memory, configured to: determine a set of frequency components to use in sidelink operation based at least in part on an inter-band carrier aggregation configuration, wherein the set of frequency components includes one or more frequency components in a first frequency band and one or more frequency components in a second frequency band; and communicate with another UE over a sidelink using one or more beams that are selected based at least in part on channel conditions associated with the one or more frequency components in the first frequency band and channel conditions associated with the one or more frequency components in the second frequency band.

In some aspects, a non-transitory computer-readable medium storing a set of instructions for wireless communication includes: one or more instructions that, when executed by one or more processors of a UE, cause the UE to: determine a set of frequency components to use in sidelink operation based at least in part on an inter-band carrier aggregation configuration, wherein the set of frequency components includes one or more frequency components in a first frequency band and one or more frequency components in a second frequency band; and communicate with another UE over a sidelink using one or more beams that are selected based at least in part on channel conditions associated with the one or more frequency components in the first frequency band and channel conditions associated with the one or more frequency components in the second frequency band.

In some aspects, an apparatus for wireless communication includes: means for determining a set of frequency components to use in sidelink operation based at least in part on an inter-band carrier aggregation configuration, wherein the set of frequency components includes one or more frequency components in a first frequency band and one or more frequency components in a second frequency band; and means for communicating with a UE over a sidelink using one or more beams that are selected based at least in part on channel conditions associated with the one or more frequency components in the first frequency band and channel conditions associated with the one or more frequency components in the second frequency band.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
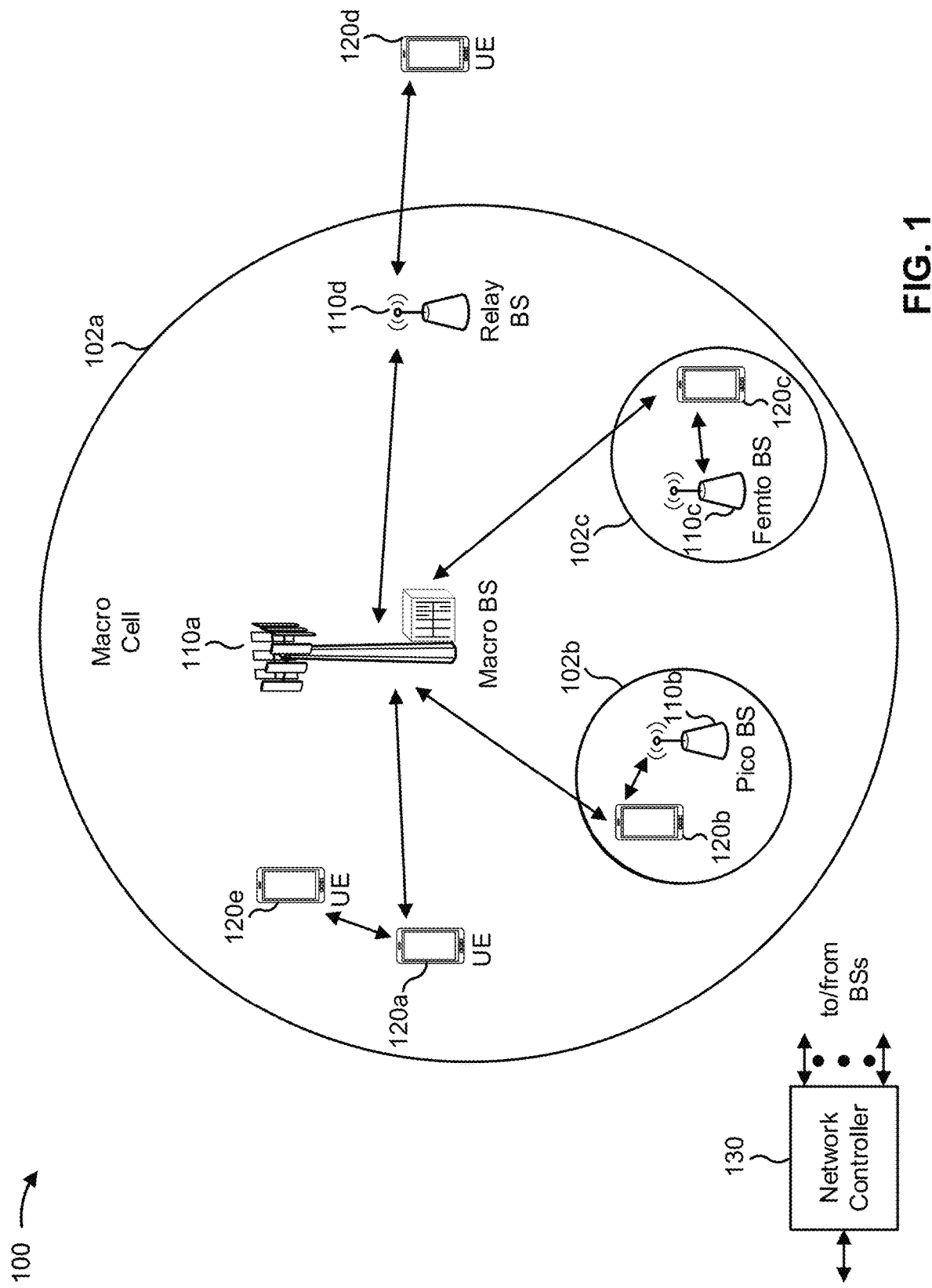
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz, may communicate using an operating band having a third frequency range (FR3), which may span from 7.125 GHz to 24.25 GHz, may communicate using an operating band having a fourth frequency range (FR4), which may span from 52.6 GHz to 114.25 GHz, and/or may communicate using an operating band having a fifth frequency range (FR5), which may include frequencies higher than 114.25 GHz (e.g., sub-terahertz). Note that FR3 is between FR1 and FR2, and FR4 and FR5 are above FR2. The frequencies between FR1 and FR2 (e.g., in FR3) are sometimes referred to as mid-band frequencies or a "sub-centimeter wave" band. Although a portion of FR1 is greater than 6 GHz, FR1 is often referred to as a "sub-6 GHz" band. Similarly, FR2, FR4, and/or the like are often referred to as "millimeter wave" bands despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, FR4, and/or FR5, and/or mid-band frequencies (e.g., less than 24.25 GHz). It is contemplated that the frequencies included in FR1, FR2, FR3, FR4, FR5, and/or other frequency ranges may be modified, and techniques described herein are applicable to those modified frequency ranges.

As indicated above, FIG. 1 is provided as an example. Other examples may differ from what is described with regard to FIG. 1.

Figure 2:
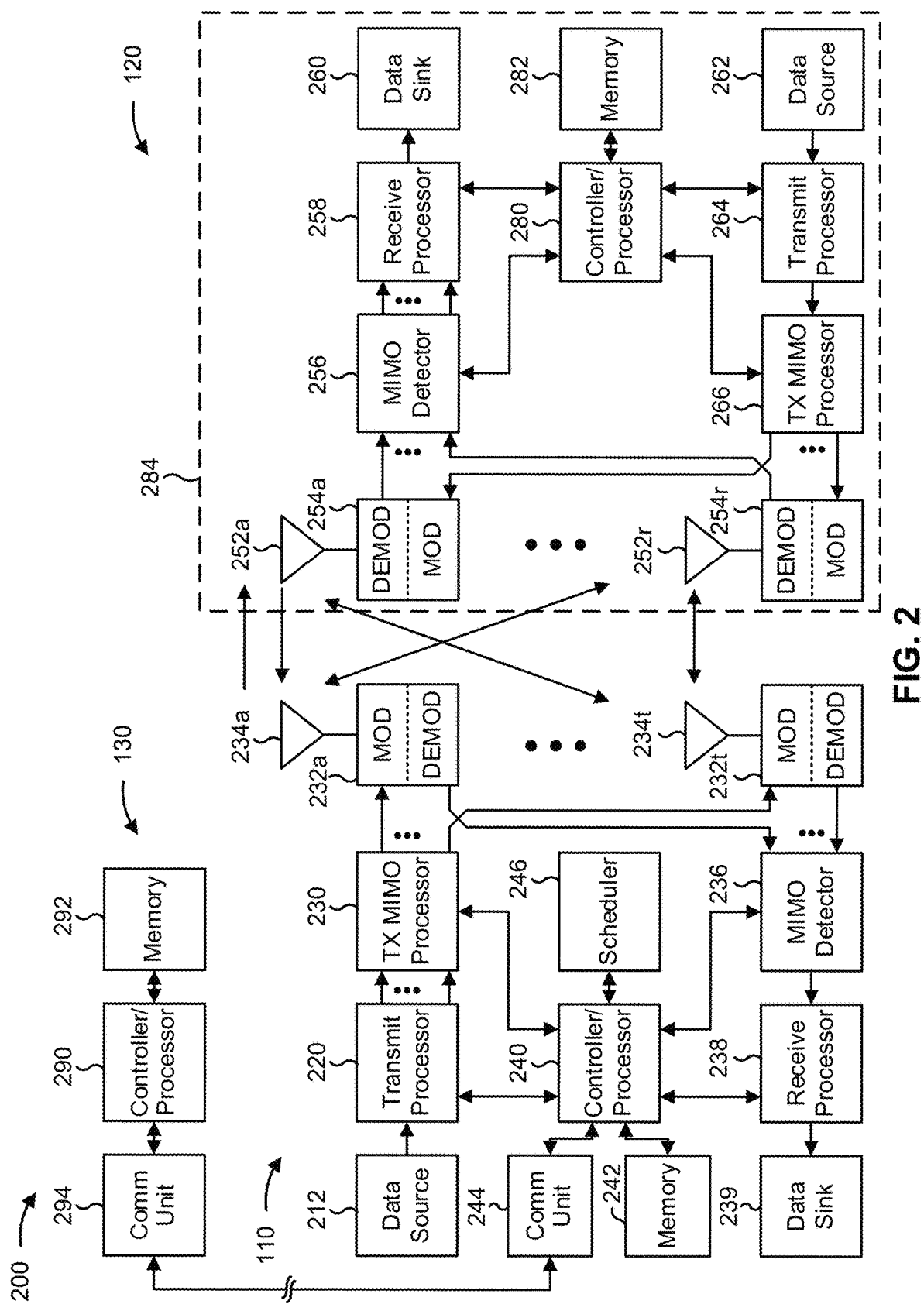
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIG. 6, FIGS. 7A-7B, and/or FIG. 8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIG. 6, FIGS. 7A-7B, and/or FIG. 8).

Controller/processor 240 of base station 110, controller/processor 280 of UE 120, and/or any other component(s) of FIG. 2 may perform one or more techniques associated with beam selection for carrier aggregation in millimeter wave (mmW) sidelinks, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, UE 120 may include means for determining a set of frequency components to use in sidelink operation based at least in part on an inter-band carrier aggregation configuration, wherein the set of frequency components includes one or more frequency components in a first frequency band and one or more frequency components in a second frequency band, means for communicating with another UE 120 over a sidelink using one or more beams that are selected based at least in part on channel conditions associated with the one or more frequency components in the first frequency band and channel conditions associated with the one or more frequency components in the second frequency band, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
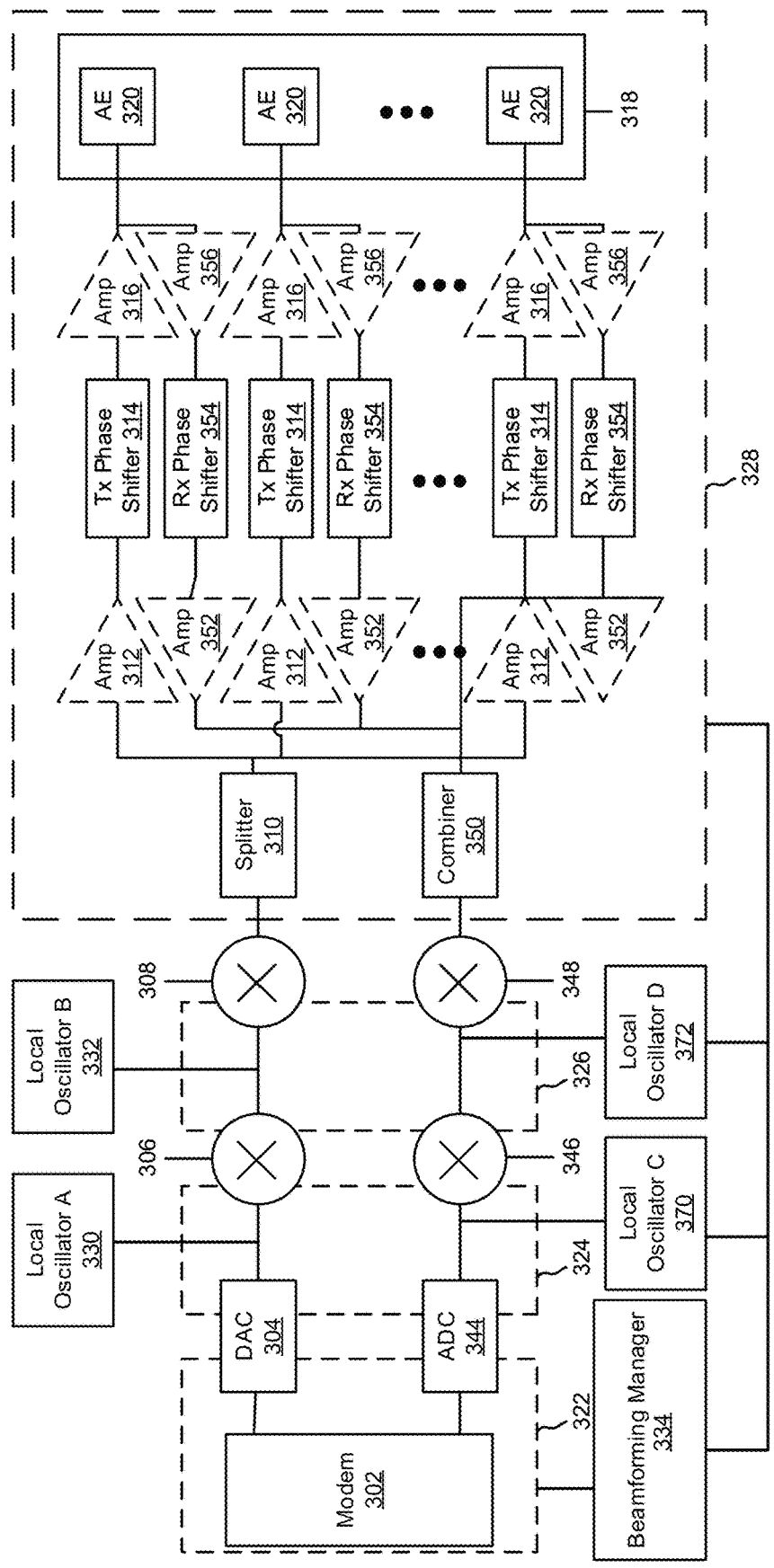
FIG. 3 is a diagram illustrating an example beamforming architecture that supports beamforming for millimeter wave (mmW) communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a beamforming manager 334.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the beamforming manager 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the beamforming manager 334) to provide independent control of the gain for each antenna element 320. For example, the modem 302 and/or the beamforming manager 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the beamforming manager 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the beamforming manager 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, the splitter 310, the amplifiers 312, 316, and/or the phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the beamforming manager 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The beamforming manager 334 may be located partially or fully within one or more other components of the architecture 300. For example, the beamforming manager 334 may be located within the modem 302 in some aspects.

As indicated above, FIG. 3 is provided as an example. Other examples may differ from what is described with regard to FIG. 3.

Figure 4:
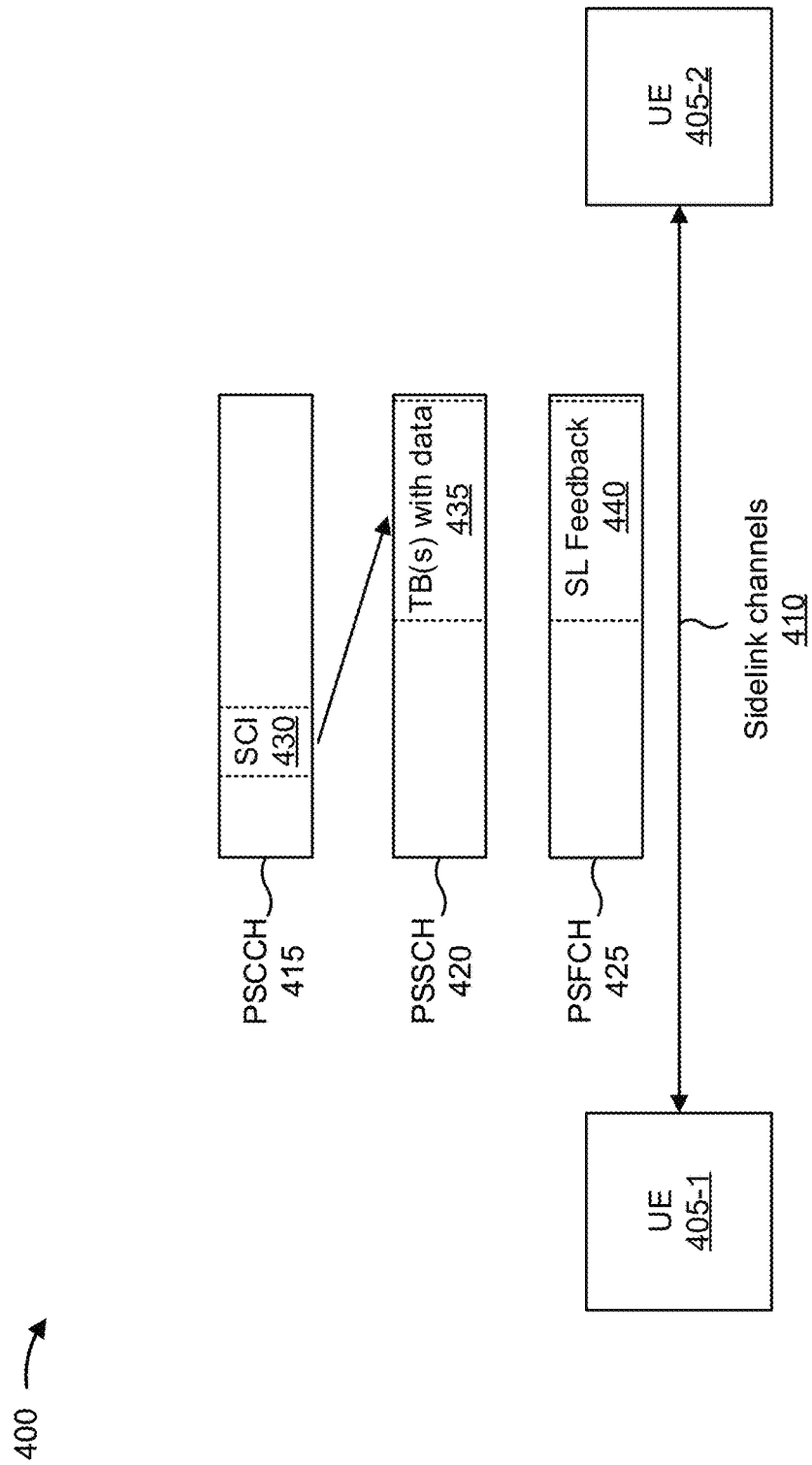
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, V2P communications, and/or the like), mesh networking, and/or the like. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the one or more sidelink channels 410 may be associated with a carrier aggregation configuration, such as intra-band carrier aggregation configuration that bonds multiple channelizations, an inter-band carrier aggregation configuration that includes component carriers in different frequency bands and/or different frequency ranges (e.g., across 28 GHz, 39 GHz, 60 GHz, and/or other frequencies), and/or the like. Additionally, or alternatively, the UEs 405 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a base station 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources, channel parameters, and/or the like. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, an MCS to be used for the upcoming sidelink transmission, and/or the like. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
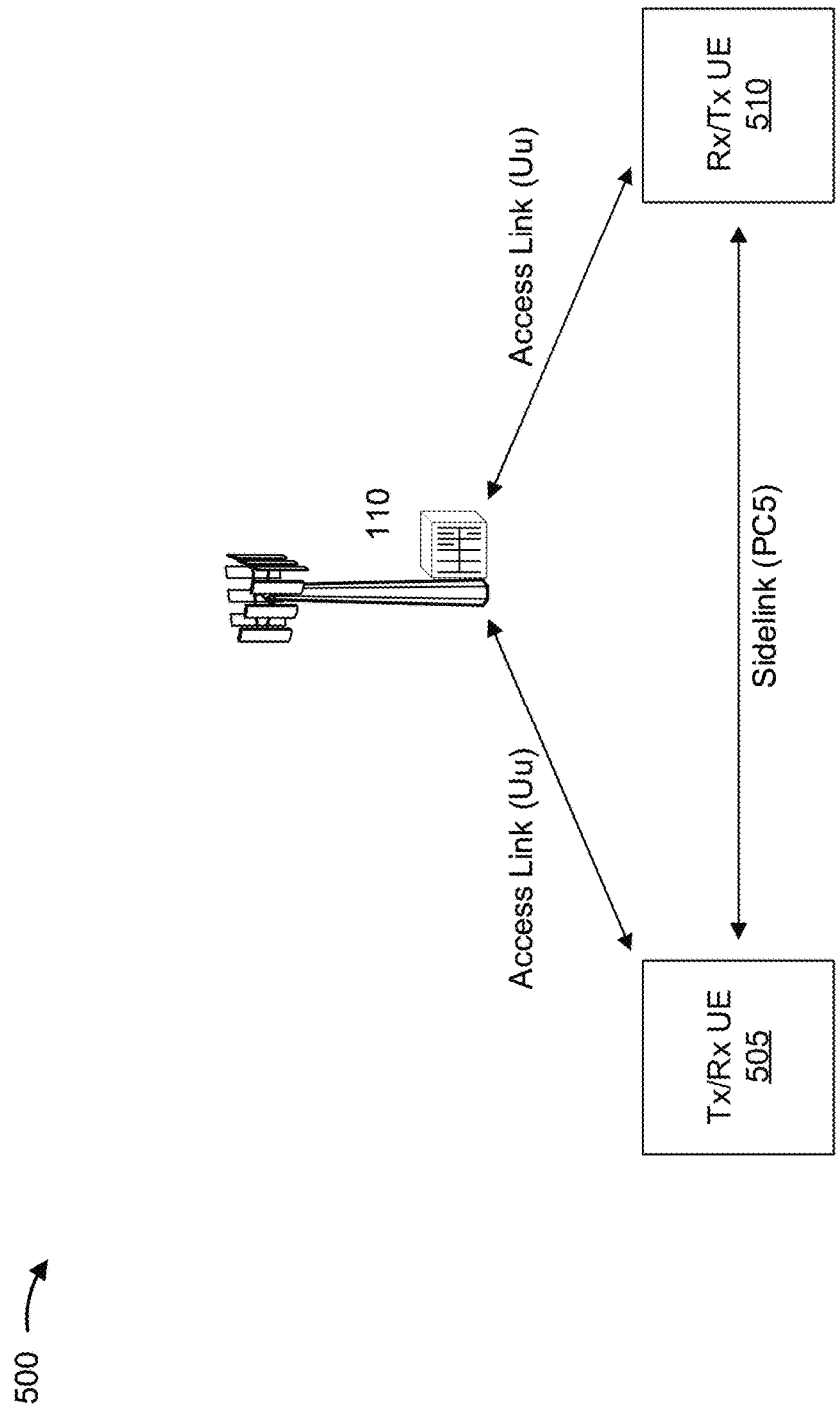
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the base station 110, the Tx/Rx UE 505, and the Rx/Tx UE 510 may operate in a radio access network (RAN) that supports communication in the millimeter wave (mmW) spectrum using directional communication (e.g., beamforming, precoding, and/or the like). For example, mmW communications may be performed in Frequency Range 2 (FR2), which includes frequency bands from 24.25 GHz to 52.6 GHz, in Frequency Range 4 (FR4), which includes frequency bands from 52.6 GHz to 114.25 GHz, and/or the like, as compared to Frequency Range 1 (FR1), which includes sub-6 GHz frequency bands and may operate in a range of approximately 450 MHz to 7.125 GHz. In general, mmW communications in FR2, FR4, and/or the like may be associated with higher data rates than FR1, which may enable services that have high performance requirements (e.g., gaming, streaming high-resolution video, and/or the like). Accordingly, in some aspects, the wireless access link between the base station 110 and the Tx/Rx UE 505 and/or the wireless access link between the base station 110 and the Rx/Tx UE 510 may use mmW signals and/or may be directed toward a target wireless node (e.g., a UE and/or a base station). Furthermore, in some aspects, sidelink communications between the Tx/Rx UE 505 and the Rx/Tx UE 510 may be performed using mmW technology and/or beamforming such that the Tx/Rx UE 505 and the Rx/Tx UE 510 may direct or otherwise steer one or more transmissions toward one another by applying different weighting patterns at different transmit antennas and/or may receive transmissions from a particular direction by using different weighting patterns to amplify a signal received at different receive antennas. Accordingly, mmW communications offer various advantages, such as increased data rates, improved radio performance, increased throughput and reliability, and/or the like.

Furthermore, in some cases, the Tx/Rx UE 505 and/or the Rx/Tx UE 510 may be configured to operate according to a carrier aggregation configuration to enable increased bandwidth, increased throughput, increased reliability, and/or the like. For example, carrier aggregation generally enables two or more component carriers (sometimes referred to as carriers) to be combined (e.g., into a single channel) for a UE to enhance data capacity. For example, component carriers can be combined in the same frequency band, in different frequency bands, in the same frequency range, in different frequency ranges, and/or the like. Additionally, or alternatively, contiguous or non-contiguous component carriers can be combined. For example, carrier aggregation may be configured for a UE in an intra-band contiguous mode (e.g., where the aggregated component carriers are contiguous to one another and are in the same frequency band), in an intra-band non-contiguous mode (e.g., the aggregated component carriers are in the same frequency band and are non-contiguous to one another), an inter-band mode (e.g., the aggregated component carriers are non-contiguous to one another and are in different frequency bands and/or different frequency ranges).

In a wireless network that supports communication in the mmW spectrum, mmW frequency ranges (e.g., FR2, FR4, and/or the like) may support both intra-band carrier aggregation and inter-band carrier aggregation. For example, in the mmW spectrum, intra-band carrier aggregation may bond or otherwise aggregate multiple channelizations within a particular frequency range, while inter-band carrier aggregation may use component carriers or other frequency components (e.g., bandwidth parts or other frequency-related assignments) across different frequency bands and/or frequency ranges (e.g., 28 GHz, 39 GHz, 60 GHz, and/or the like). For example, an inter-band carrier aggregation configuration in the mmW spectrum may include two or more component carriers in different frequency bands within FR2, two or more component carriers in different frequency bands within FR4, at least one component carrier in FR2 and at least one component carrier in FR4, and/or the like. While inter-band carrier aggregation can enable various high-performance use cases, inter-band carrier aggregation poses various challenges with respect to beam management because mmW signals have a higher frequency and a shorter wavelength than various other radio waves used for communications (e.g., sub-6 GHz communications), whereby mmW signals may have shorter propagation distances, may be subject to atmospheric attenuation, may be more easily blocked and/or subject to penetration loss through objects or other obstructions compared to other types of radio waves, and/or the like.

For example, when beamforming is used to communicate in the mmW spectrum, a transmitting device may generate a transmit beam, and a receiving device may generate a corresponding receive beam. The transmit beam may be reflected, diffracted, scattered, and/or the like by one or more clusters, obstacles, materials, and/or the like within an environment between or around the transmitting and receiving devices. For example, as used herein, the term "cluster" may generally refer to objects in the channel environment through which energy propagates. Example clusters in mmW channel environments may include reflectors such as lamp posts, vehicles, glass/window panes, metallic objects, and/or the like, diffractors such as edges or corners of buildings, walls, and/or the like, and/or scattering via irregular objects such as walls, human bodies (e.g., a hand blocking an antenna module when a device is operated in a gaming mode), and/or the like. In inter-band carrier aggregation contexts, when penetration loss, blockage, or other environmental factors cause a disruption or impairment to a beam associated with one component carrier, there may be a differential degradation in signal strength for a beam associated with another component carrier. For example, because FR4 generally includes higher frequencies than FR2, the degradation or impairment may be worse for component carriers in FR4 relative to component carriers in FR2 (e.g., a beam failure in FR2 is likely to also indicate a beam failure in FR4, but a beam failure in FR4 may not indicate a beam failure in FR2). Accordingly, when inter-band carrier aggregation and beamforming are used in mmW spectrum, beams associated with different frequency bands or different frequency ranges may be subject to different channel properties even when the beams are pointing in the same direction, which significantly complicates beam management processes such as beam selection, beam failure detection, beam failure recovery, and/or the like.

Some aspects described herein relate to techniques and apparatuses to perform beam selection when two UEs are configured to communicate on a sidelink using an inter-band carrier aggregation configuration that includes one or more mmW frequency components (e.g., component carriers, bandwidth parts, or other frequency-related assignments). For example, in some aspects, a UE may communicate with another UE over a sidelink according to an inter-band, intra-range carrier aggregation configuration that includes multiple frequency components (e.g., component carriers and/or the like) that are in different frequency bands but the same frequency range. Additionally, or alternatively, the UEs may communicate over the sidelink according to an inter-band, inter-range carrier aggregation configuration that includes one or more frequency components in a first frequency range and one or more frequency components in a second frequency range. Accordingly, in some aspects, the UEs may communicate over one or more beams that are selected based at least in part on channel conditions associated with one or more frequency components in a first frequency band and channel conditions associated with one or more frequency components in a second frequency band, where the first frequency band and the second frequency band may be in the same frequency range or different frequency ranges. For example, in some aspects, the one or more beams may be selected by the UEs, or by a base station that communicates with one or more of the UEs over an access link. In some aspects, the selection of the one or more beams may be based at least in part on preferences that one or more of the UEs indicate with respect to one or more frequency ranges or frequency bands that the UE(s) prefer to use to communicate on the sidelink, one or more frequency ranges or frequency bands that the UE(s) prefer to mute or temporarily disable, and/or the like. Furthermore, in some aspects, beams in different frequency bands, different frequency ranges, and/or the like may be associated with asymmetric (e.g., independent) or symmetric (e.g., common) beam weights (e.g., based on RF chain configurations associated with the UEs, channel conditions, and/or the like). In this way, UEs may communicate over the sidelink in the mmW spectrum using an inter-band carrier aggregation configuration to enable higher data rates, improve spectral efficiency, and/or the like, and beam selection may be coordinated within and/or across different frequency bands and/or frequency ranges according to different channel properties that may exist in the different frequency bands and/or frequency ranges.

As indicated above, FIG. 5 is provided as an example. Other examples may differ from what is described with respect to FIG. 5.

Figure 6A:
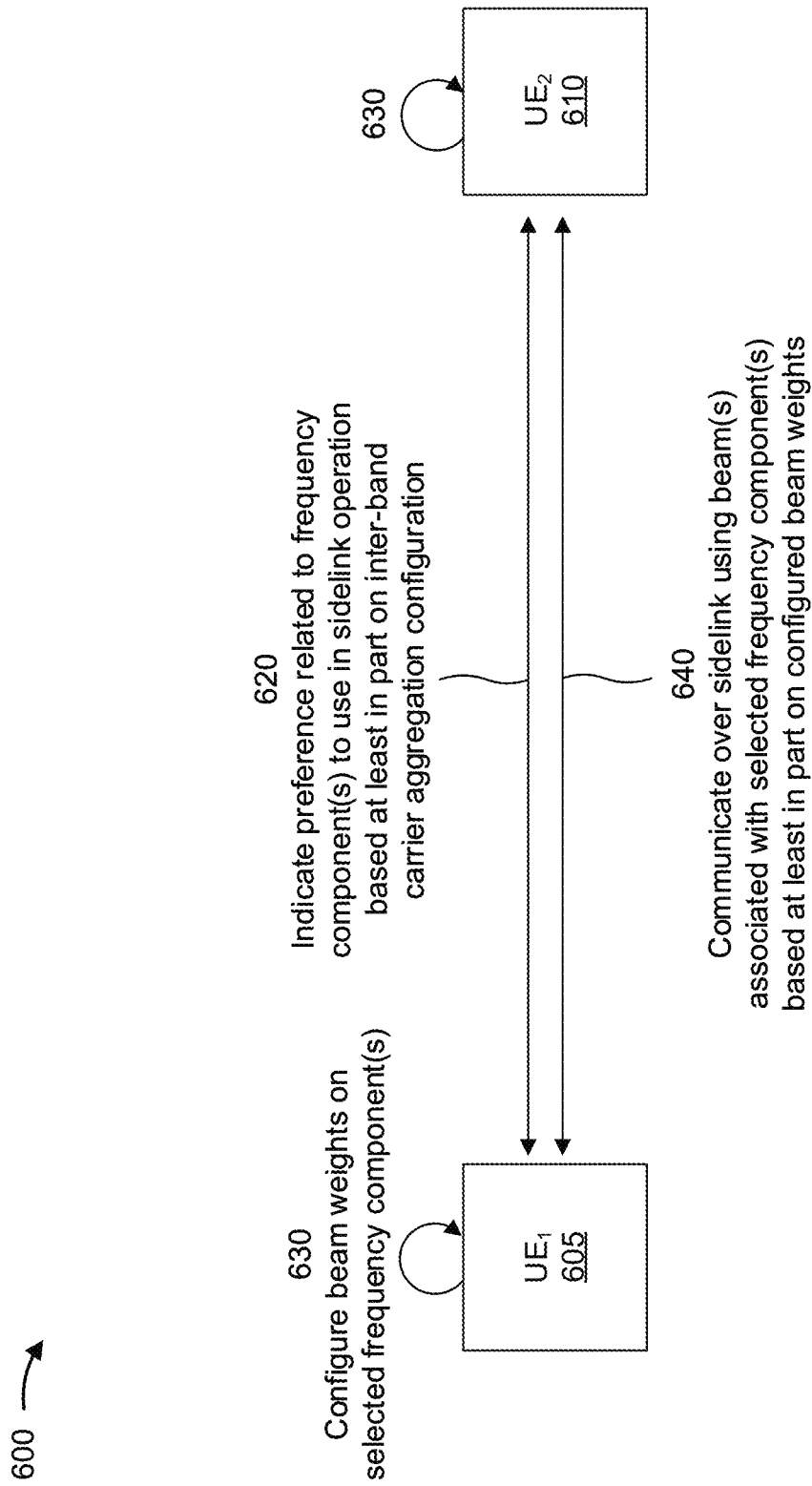
FIGS. 6A-6B are diagrams illustrating examples associated with beam selection for carrier aggregation in mmW sidelinks, in accordance with the present disclosure.
Figure 6B:
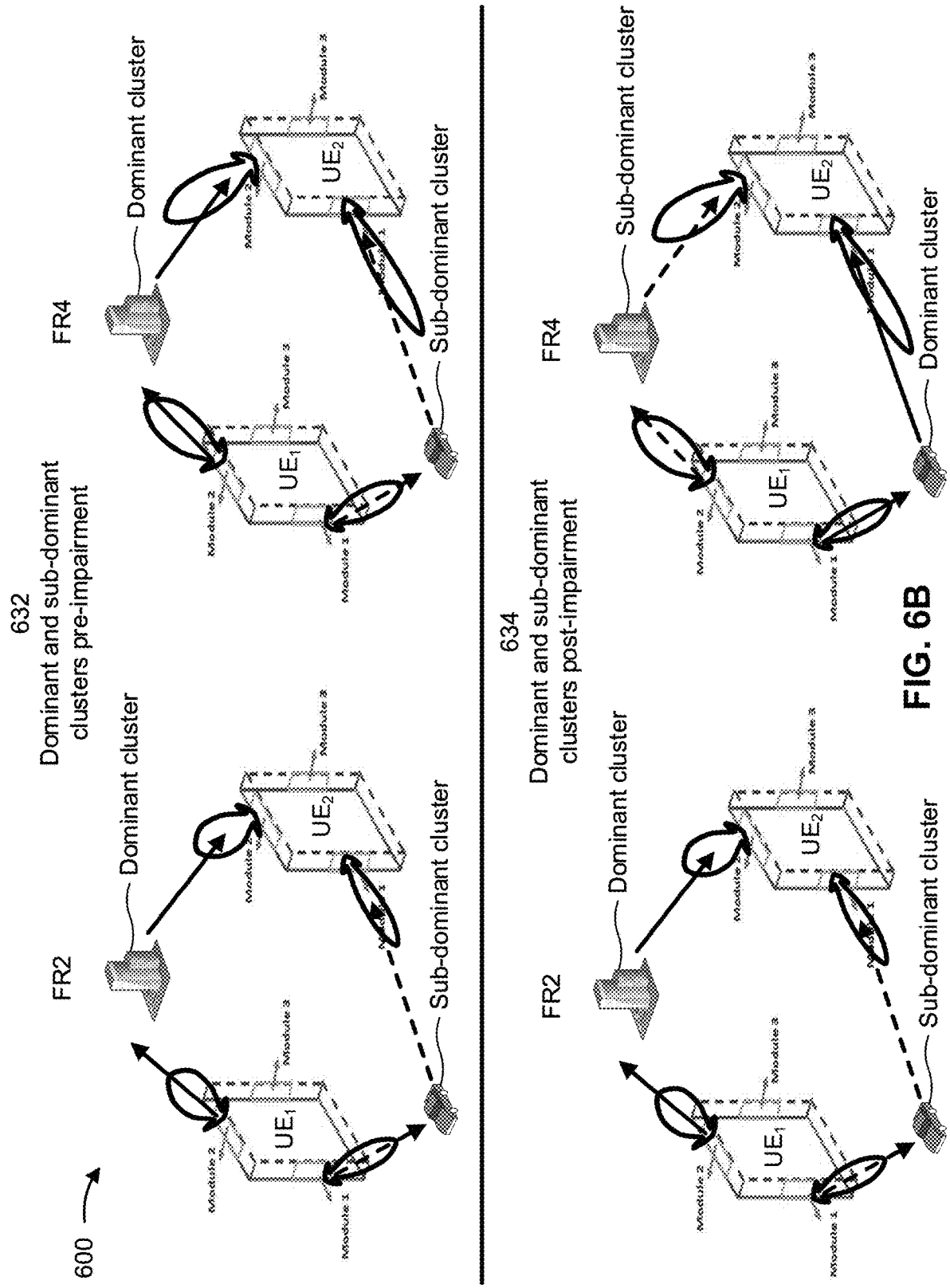

FIGS. 6A-6B are diagrams illustrating examples 600 associated with beam selection for carrier aggregation in mmW sidelinks, in accordance with the present disclosure. As shown in FIG. 6, example(s) 600 includes a first UE 605 (shown as UE1) and a second UE 610 (shown as UE2) communicating in a wireless network (e.g., wireless network 100). In some aspects, the UEs 605, 610 may communicate over a sidelink according to an inter-band carrier aggregation configuration that includes one or more component carriers, bandwidth parts, and/or other frequency-related assignments associated with a first frequency band and one or more component carriers, bandwidth parts, and/or other frequency-related assignments associated with a second frequency band. For example, in some aspects, each frequency band may correspond to an entire frequency range (e.g., FR2 or FR4), a set of one or more frequencies (e.g., one or more component carriers or bandwidth parts) within a frequency range, and/or the like. Accordingly, while some aspects may be described herein in a context that relates to inter-band, inter-range carrier aggregation (e.g., FR2+FR4), it will be appreciated that the same or similar techniques may be applied to inter-band, intra-range carrier aggregation (e.g., FR2+FR2, FR4+FR4), and/or the like.

Furthermore, as described herein, the UEs 605, 610 may communicate over a beamformed sidelink, which may include a first beam associated with the one or more frequency components in the first frequency band, a second beam associated with the one or more frequency components in the second frequency band, and/or the like. Accordingly, the first beam and the second beam may generally be subject to different channel properties even when the first beam and the second beam are steered toward the same or similar clusters in a channel, and a variation in the channel properties associated with the different beams may depend on a separation or distance between the frequency component(s) in the first frequency band the frequency component(s) in the second frequency band. For example, a beamforming gain experienced over a cluster in FR2 and a beamforming gain experienced over the same cluster in FR4 may generally be frequency-dependent, and a change (e.g., degradation) in beamforming performance over the same cluster with an impairment (e.g., hand blockage or penetration loss due to a change in position, object movement, and/or the like) may also be frequency-dependent. However, variations in the frequency-dependent beamforming gain in a pre-impairment scenario are typically fairly minor, but performance loss or degradation is typically more severe at higher frequencies than lower frequencies.

Accordingly, the viability of a particular cluster (and therefore a particular beam steered toward the particular cluster) may vary across frequencies (e.g., across different bandwidth parts, different frequency bands, different frequency ranges, and/or the like). For example, degradation or failure of beam in a higher frequency range (e.g., FR4) may not indicate degradation or failure of beam in a lower frequency range (e.g., FR2) because performance loss or degradation is typically more severe at higher frequencies. However, beamforming performance (e.g., beamforming gain, beam degradation, signal loss, beam failure, and/or the like) may generally be correlated within a frequency band or within a frequency range. As a result, a viable beam in a first frequency band or a first frequency range may (or may not) be viable in a second frequency band or a second frequency range, and vice versa. Accordingly, as described herein, one or more beams that the UEs 605, 610 use to communicate over the sidelink may be selected (e.g., by the UEs 605, 610, by a base station, and/or the like) based at least in part on frequency-dependent channel conditions, UE preferences, UE capabilities, and/or the like. Furthermore, as described herein, the beam selection may be carried out in connection with initial and/or ongoing beam management, beam degradation, beam failure detection, beam failure recovery, and/or the like.

As shown in FIG. 6, and by reference number 620, each of the UEs 605, 610 may indicate one or more preferences that relate to one or more frequency components to be used in sidelink operation based at least in part on an inter-band carrier aggregation configuration. In some aspects, the UEs 605, 610 may indicate the one or more preferences to a base station configured to perform the beam selection. For example, because channel conditions in different frequency bands, different frequency ranges, and/or the like can change dynamically, the base station may control resource allocations (e.g., beam weight choices) to be used for the different frequency bands, different frequency ranges, and/or the like based at least in part on the UEs 605, 610 indicating which beams are viable and/or which beams are not viable (e.g., due to an impairment) in the different frequency bands, different frequency ranges, and/or the like. In this way, the base station may provide centralized control over the beam selection process based at least in part on visibility into the dynamic channel conditions that may be obtained from various UEs served by the base station. Additionally, or alternatively, having the base station perform the beam selection may enable interference coordination to ensure that sidelink communication between the UEs 605, 610 does not create excessive interference with access link and/or other sidelink communications. Additionally, or alternatively, the UEs 605, 610 may indicate the one or more preferences to each other to enable autonomous beam selection by the UEs 605, 610. For example, in some scenarios, coordination via a base station may be cumbersome or impractical, and autonomous beam selection for the sidelink may be useful (e.g., between vehicular UEs, cell-edge UEs, or other UEs that may be close to each other but geographically distant from a base station).

In some aspects, the preference(s) indicated by the UEs 605, 610 with respect to the frequency component(s) to be used in sidelink operation may include a preferred frequency range, a preferred frequency band, and/or the like. For example, one or more of the UEs 605, 610 may be using a particular frequency band or frequency range to communicate with a base station on an access link or Uu interface, and may therefore prefer to use a different frequency band or frequency range in sidelink operation (e.g., the UEs 605, 610 may indicate a preference to communicate on the sidelink using FR4 when communicating with the base station using FR2, or vice versa). Additionally, or alternatively, UE 605 may determine that a beam in a particular frequency range or frequency band has a poor link condition to UE 610, or vice versa, and may therefore prefer to use a different frequency range or frequency band for the sidelink (e.g., may prefer to use FR2 if an FR4 beam has a poor link condition). Additionally, or alternatively, one or more of UEs 605, 610 may determine that communication using a higher frequency (e.g., FR4) is associated with a high thermal overhead (e.g., heat to be dissipated) or high power consumption, whereby the UE(s) 605, 610 may prefer to communicate in a lower frequency (e.g., FR2) that is associated with a smaller thermal overhead, lower power consumption, and/or the like. Furthermore, in some aspects, each of the UEs 605, 610 may indicate one or multiple preferred frequency ranges, or the UEs 605, 610 may indicate one or multiple preferred frequency bands, preferred bandwidth parts, preferred component carriers, and/or the like within a particular frequency range or across different frequency ranges.

Additionally, or alternatively, one or more of the UEs 605, 610 may dynamically request to mute or transition one or more component carriers, bandwidth parts, frequency bands, frequency ranges, and/or the like to a dormant state (e.g., via a secondary cell (Scell) dormancy indication). In this way, the UE(s) 605, 610 may implicitly indicate a lower priority for the component carriers, bandwidth parts, frequency bands, frequency ranges, and/or the like to be muted, and/or may implicitly indicate a preference to communicate using one or more other component carriers, bandwidth parts, frequency bands, frequency ranges, and/or the like.

As further shown in FIG. 6A, and by reference number 630, the UEs 605, 610 may configure a set of beam weights for one or more beams associated with one or more frequency components that are selected based at least in part on the preference(s) indicated by each of the UE 605, 610. Furthermore, in some aspects, the frequency components to be used in sidelink operation between the UEs 605, 610 may be selected by the UEs 605, 610 as part of an autonomous beam selection process, or the frequency components to be used in sidelink operation between the UEs 605, 610 may be selected by a base station as part of a centralized beam selection process. In some aspects, the frequency components that are selected for use in sidelink operation may include one or more frequency components within a frequency range (e.g., in an inter-band, intra-range carrier aggregation configuration), across frequency ranges (e.g., in an inter-band, inter-range carrier aggregation configuration), and/or the like.

In some aspects, configuring the set of beam weights may generally include determining (e.g., by the UEs 605, 610 in an autonomous beam selection process or by a base station in a centralized beam selection process) a dominant cluster and one or more sub-dominant clusters for the sidelink channel between the UEs 605, 610. For example, as described above, different frequency components may generally be subject to different channel properties, with higher frequencies typically being more sensitive to impairments that are caused by blockage, penetration loss, and/or the like. Accordingly, while a cluster in a first frequency range (e.g., FR2) is likely to also be a cluster in a second frequency range (e.g., FR4) and vice versa in a pre-impairment scenario, an impairment (e.g., a user placing a hand over an antenna module while gaming), the impairment is likely to degrade a beamforming gain to a larger extent for a beam associated with the higher frequency (e.g., due to the shorter wavelength).

For example, FIG. 6B illustrates an example pre-impairment scenario 632 including dominant cluster and sub-dominant clusters in a first frequency range (e.g., FR2) and a second frequency range (e.g., FR4). In the pre-impairment scenario 632, a building that acts as a reflector may be a dominant cluster in both frequency ranges, and a vehicle that acts as a reflector may be a sub-dominant cluster in both frequency ranges. In this case, a beam used to communicate in a frequency component associated with FR2 and a beam used to communicate in a frequency component associated with FR4 point in the same gross direction (e.g., towards the building), and the only difference is that the beam in the higher frequency range (e.g., FR4) is relatively narrower and has a relatively longer range because more antenna elements are used to form the beam. However, as further shown in FIG. 6B, and by reference number 634, the dominant and sub-dominant clusters may cease to be symmetric across different frequency ranges in a post-impairment scenario. For example, a user may place a hand over an antenna module (e.g., module 2) that is used to steer a beam toward the building that acts as the dominant cluster in the pre-impairment scenario. In this case, the impairment may degrade the quality of the FR2 beam and the FR4 beam, but the degradation to the FR4 beam may be more severe than the degradation to the FR2 beam. Consequently, the building may remain a dominant cluster in FR2 post-impairment, but the building becomes a sub-dominant cluster and the vehicle becomes the dominant cluster in FR4 post-impairment.

Accordingly, the following table generally illustrates the dynamic channel conditions that may exist in different frequency ranges pre-impairment and post-impairment, although it will be appreciated that the same concepts may apply to different frequency bands, bandwidth parts, and/or the like within a frequency range.

TABLE 1

Pre-Impairment and Post-Impairment Gains

| Scenario | Cluster | FR2 Gain (in dB) | FR4 Gain (in dB) |
| --- | --- | --- | --- |
| Pre-impairment | Dominant | $A_1$ | $A_2$ |
| Pre-impairment | Sub-dominant | $B_1$ | $B_2$ |
| Post-impairment | Dominant | $A_1 - \Delta_1$ | $A_2 - \Delta_2$ |
| Post-impairment | Sub-dominant | $B_1$ | $B_2$ |

With reference to Table 1, and the example pre-impairment and post-impairment scenarios 632, 634 shown in FIG. 6B, $A_1 \approx A_2$ and $B_1 \approx B_2$ because beamforming gains seen over the same cluster in different frequencies may generally have minor variations in a pre-impairment scenario. Furthermore, because a dominant cluster generally has a higher beamforming gain than a sub-dominant cluster, $A_1 > B_1$ and $A_2 > B_2$. However, in a post-impairment scenario caused by blockage or penetration loss, the impairment may cause a larger degradation in the higher frequency range (FR4 in this example) than the lower frequency range (FR2 in this example) such that $A_1 - \Delta_1 > B_1$ and $B_2 > A_2 - \Delta_2$. For example, assuming an impairment that causes a 5 dB degradation to the beam steered toward the pre-impairment dominant cluster in the lower frequency range (e.g., $\Delta_1 = 5$ dB) causes a 10 dB degradation to the beam steered toward the pre-impairment dominant cluster in the higher frequency range (e.g., $\Delta_2 = 10$ dB), beam switching would need to be performed across frequency ranges if 5 dB$<A_1-B_1 \approx A_2-B_2<$10 dB. In other words, in the lower frequency range, the dominant cluster remains a dominant cluster despite the impairment causing a 5 dB loss, but the 10 dB loss that the impairment causes in the higher frequency range necessitates a beam switch because the loss causes the pre-impairment dominant cluster to become a sub-dominant cluster.

Accordingly, in some aspects, configuring the beam weights to be used on the selected frequency component(s) may include determining a dominant cluster in each frequency component and determining a set of beam weights to form a beam that is steered toward the dominant cluster. Furthermore, as described above, the dominant cluster at different frequencies may be the same or similar, typically with minor variations, in a pre-impairment scenario, but the dominant clusters are more likely to be different at different frequencies post-impairment because the impairment may generally cause a larger loss due to the shorter wavelength at the higher frequency. Accordingly, in cases where the UEs 605, 610 are configured to use different RF chains to communicate using the different frequency components that are selected to be used in sidelink operation and/or the different frequency components are associated with different dominant clusters, asymmetric beam pairing may be performed across the different frequency components. For example, a first beam used to communicate using one or more component carriers in a first frequency range (e.g., FR2) may be associated with a first set of beam weights, and a second beam used to communicate using one or more component carriers in a second frequency range (e.g., FR4) may be associated with a second set of beam weights that differs from the first set of beam weights. Alternatively, in cases where one or more of the UEs 605, 610 are configured to use a common RF chain to communicate using different frequency components (e.g., to communicate in FR2 and FR4) and/or the different frequency components are associated with the same dominant cluster, a common beam pair that mitigates performance loss across the different frequency components may be used. For example, a first beam used to communicate using one or more component carriers in a first frequency range (e.g., FR2) and a second beam used to communicate using one or more component carriers in a second frequency range (e.g., FR4) may be associated with the same beam weights (e.g., may be quasi co-located) based on which cluster(s) in the channel are associated with the least beamforming loss. Additionally, or alternatively, in cases where a suitable cluster is unavailable in a particular frequency component (e.g., all FR4 beams are associated with a gain that fails to satisfy a threshold), one or more of the UEs 605, 610 may indicate a preference to communicate using only a beam associated with a frequency component that has an available cluster that satisfies the threshold, and communication via the other frequency component may be requested at a later time (e.g., when channel conditions improve). For example, the preference may be indicated using an Scell dormancy operation, a power savings request, and/or the like, and the requesting UE may request non-operation of the frequency component with no control channel monitoring (e.g., no PDCCH or PSCCH monitoring).

As further shown in FIG. 6A, and by reference number 640, the UEs 605, 610 may then communicate over the sidelink using one or more beams that are associated with the selected frequency component(s) based at least in part on the beam weights that are configured for the one or more beams. For example, the selected frequency components may include one or more frequency components in a first frequency range, one or more frequency components in a second frequency range, and/or the like, and one or more of the frequency components may be associated with a dominant cluster that offers a beamforming gain that satisfies a threshold. Accordingly, the beam weights may be configured to generate a transmit beam and/or a receive beam that is steered toward the dominant cluster, whereby the choice of beam weights to be used for the one or more beams may be a function of channel conditions (e.g., channel sparsity and/or channel richness, which may be a function of the number of viable clusters in the channel between the UEs 605, 610).

As indicated above, FIGS. 6A-6B are provided as examples. Other examples may differ from what is described with respect to FIGS. 6A-6B.

Figure 7:
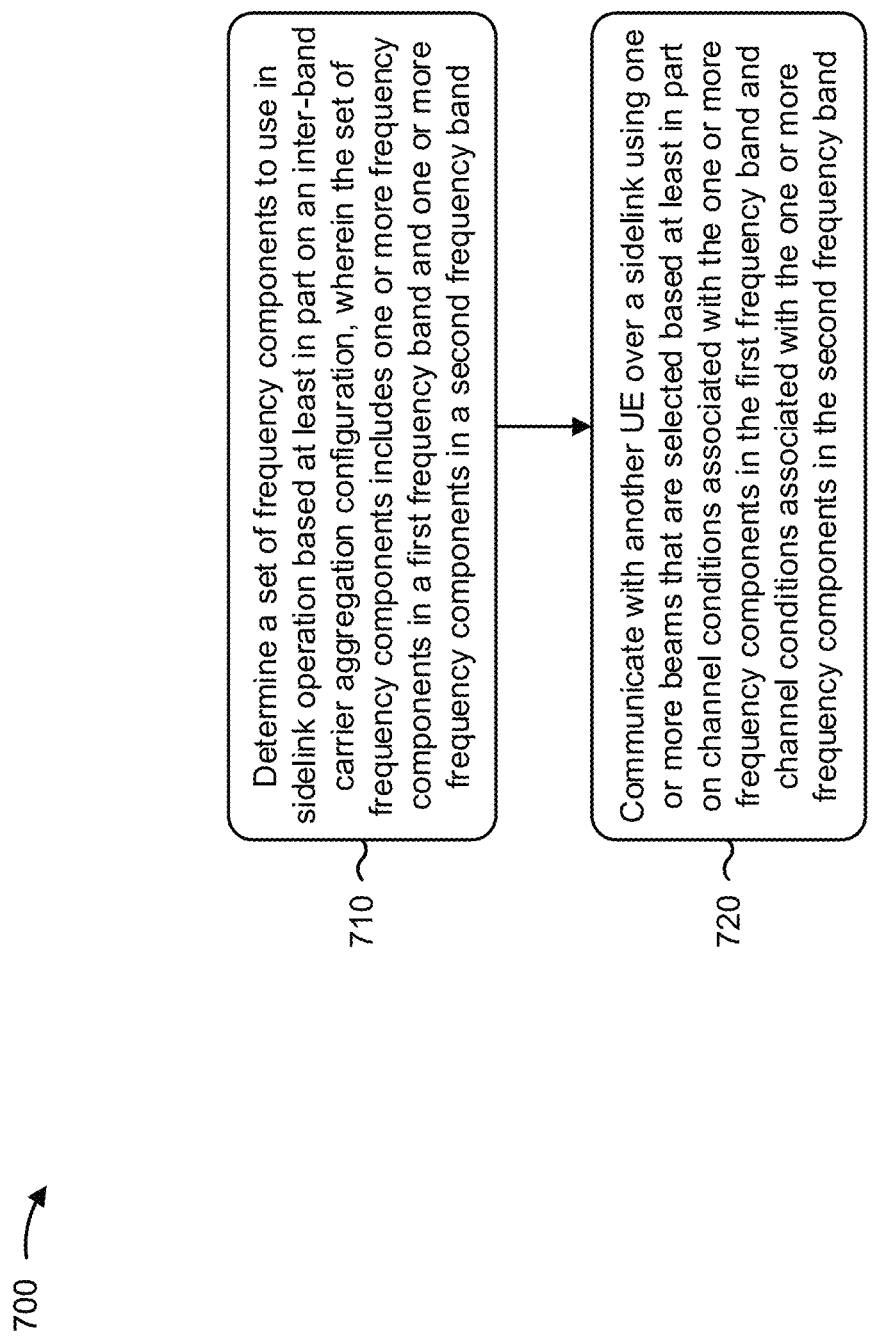
FIG. 7 is a diagram illustrating an example process associated with beam selection for carrier aggregation in mmW sidelinks, in accordance with the present disclosure.

FIG. 7 is a diagram illustrating an example process 700 performed, for example, by a UE, in accordance with the present disclosure. Example process 700 is an example where the UE (e.g., UE 120, UE 405, Tx/Rx UE 505, Rx/Tx UE 510, UE 605, UE 610, and/or the like) performs operations associated with beam selection for carrier aggregation in mmW sidelinks.

As shown in FIG. 7, in some aspects, process 700 may include determining a set of frequency components to use in sidelink operation based at least in part on an inter-band carrier aggregation configuration, wherein the set of frequency components includes one or more frequency components in a first frequency band and one or more frequency components in a second frequency band (block 710). For example, the UE may determine (e.g., using antenna 252, demodulator 254, MIMO detector 256, receive processor 258, transmit processor 264, TX MIMO processor 266, modulator 254, controller/processor 280, memory 282, and/or architecture 300) a set of frequency components to use in sidelink operation based at least in part on an inter-band carrier aggregation configuration, as described above. In some aspects, the set of frequency components includes one or more frequency components in a first frequency band and one or more frequency components in a second frequency band.

As further shown in FIG. 7, in some aspects, process 700 may include communicating with another UE over a sidelink using one or more beams that are selected based at least in part on channel conditions associated with the one or more frequency components in the first frequency band and channel conditions associated with the one or more frequency components in the second frequency band (block 720). For example, the UE may communicate (e.g., using antenna 252, demodulator 254, MIMO detector 256, receive processor 258, transmit processor 264, TX MIMO processor 266, modulator 254, controller/processor 280, memory 282, and/or architecture 300) with another UE over a sidelink using one or more beams that are selected based at least in part on channel conditions associated with the one or more frequency components in the first frequency band and channel conditions associated with the one or more frequency components in the second frequency band, as described above.

Process 700 may include additional aspects, such as any single aspect or any combination of aspects described below and/or in connection with one or more other processes described elsewhere herein.

In a first aspect, the one or more beams include a first beam associated with a first set of beam weights and a second beam associated with a second set of beam weights based at least in part on the channel conditions associated with the one or more frequency components in the first frequency band and the channel conditions associated with the one or more frequency components in the second frequency band.

In a second aspect, alone or in combination with the first aspect, the first set of beam weights and the second set of beam weights are independently determined based at least in part on the UE and the other UE using different RF chains to communicate over the sidelink in the first frequency band and the second frequency band.

In a third aspect, alone or in combination with one or more of the first and second aspects, the first set of beam weights and the second set of beam weights are determined to mitigate performance loss in the first frequency band and the second frequency band based at least in part on the UE and the other UE using a common RF chain to communicate over the sidelink in the first frequency band and the second frequency band.

In a fourth aspect, alone or in combination with one or more of the first through third aspects, the first set of beam weights and the second set of beam weights are based at least in part on a first number of clusters in a channel of the first frequency band and a second number of clusters in a channel of the second frequency band.

In a fifth aspect, alone or in combination with one or more of the first through fourth aspects, the one or more beams include only a beam associated with the first frequency band based at least in part on the channel conditions associated with the one or more frequency components in the second frequency band.

In a sixth aspect, alone or in combination with one or more of the first through fifth aspects, process 700 includes transmitting, to the other UE, a request to mute the second frequency band.

In a seventh aspect, alone or in combination with one or more of the first through sixth aspects, process 700 includes transmitting, to the other UE, a request to enable communication via the second frequency band based at least in part on a change in the channel conditions associated with the one or more frequency components in the second frequency band.

In an eighth aspect, alone or in combination with one or more of the first through seventh aspects, process 700 includes receiving, from a base station, information indicating the one or more beams to use to communicate with the other UE over the sidelink.

In a ninth aspect, alone or in combination with one or more of the first through eighth aspects, process 700 includes transmitting, to the base station, information indicating one or more candidate beams for the one or more frequency components in the first frequency band and the one or more frequency components in the second frequency band, where the one or more beams indicated by the base station are selected from the one or more candidate beams.

In a tenth aspect, alone or in combination with one or more of the first through ninth aspects, process 700 includes communicating with the other UE to autonomously select the one or more beams to use to communicate over the sidelink.

In an eleventh aspect, alone or in combination with one or more of the first through tenth aspects, the set of frequency components to use in sidelink operation is determined based at least in part on one or more of the UE or the other UE indicating a preference with respect to a particular frequency band or one or more frequency components within a particular frequency band.

In a twelfth aspect, alone or in combination with one or more of the first through eleventh aspects, the preference is based at least in part on one or more of a frequency band used for access link communication with a base station, the channel conditions associated with the one or more frequency components in the first frequency band, the channel conditions associated with the one or more frequency components in the second frequency band, thermal overhead associated with one or more of the first frequency band or the second frequency band, or power consumption associated with one or more of the first frequency band or the second frequency band.

In a thirteenth aspect, alone or in combination with one or more of the first through twelfth aspects, the first frequency band includes one or more frequencies in a first frequency range, and the second frequency band includes one or more frequencies in a second frequency range.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a UE, comprising: determining a set of frequency components to use in sidelink operation based at least in part on an inter-band carrier aggregation configuration, wherein the set of frequency components includes one or more frequency components in a first frequency band and one or more frequency components in a second frequency band; and communicating with another UE over a sidelink using one or more beams that are selected based at least in part on channel conditions associated with the one or more frequency components in the first frequency band and channel conditions associated with the one or more frequency components in the second frequency band.

Aspect 2: The method of Aspect 1, wherein the one or more beams include a first beam associated with a first set of beam weights and a second beam associated with a second set of beam weights based at least in part on the channel conditions associated with the one or more frequency components in the first frequency band and the channel conditions associated with the one or more frequency components in the second frequency band.

Aspect 3: The method of Aspect 2, wherein the first set of beam weights and the second set of beam weights are independently determined based at least in part on the UE and the other UE using different RF chains to communicate over the sidelink in the first frequency band and the second frequency band.

Aspect 4: The method of Aspect 2, wherein the first set of beam weights and the second set of beam weights are determined to mitigate performance loss in the first frequency band and the second frequency band based at least in part on the UE and the other UE using a common RF chain to communicate over the sidelink in the first frequency band and the second frequency band.

Aspect 5: The method of any of Aspects 2-4, wherein the first set of beam weights and the second set of beam weights are based at least in part on a first number of clusters in a channel of the first frequency band and a second number of clusters in a channel of the second frequency band.

Aspect 6: The method of Aspect 1, wherein the one or more beams include only a beam associated with the first frequency band based at least in part on the channel conditions associated with the one or more frequency components in the second frequency band.

Aspect 7: The method of Aspect 6, further comprising: transmitting, to the other UE, a request to mute the second frequency band.

Aspect 8: The method of Aspect 7, further comprising: transmitting, to the other UE, a request to enable communication via the second frequency band based at least in part on a change in the channel conditions associated with the one or more frequency components in the second frequency band.

Aspect 9: The method of any of Aspects 1-8, further comprising: receiving, from a base station, information indicating the one or more beams to use to communicate with the other UE over the sidelink.

Aspect 10: The method of Aspect 9, further comprising: transmitting, to the base station, information indicating one or more candidate beams for the one or more frequency components in the first frequency band and the one or more frequency components in the second frequency band, wherein the one or more beams indicated by the base station are selected from the one or more candidate beams.

Aspect 11: The method of any of Aspects 1-8, further comprising: communicating with the other UE to autonomously select the one or more beams to use to communicate over the sidelink.

Aspect 12: The method of any of Aspects 1-11, wherein the set of frequency components to use in sidelink operation is determined based at least in part on one or more of the UE or the other UE indicating a preference with respect to a particular frequency band or one or more frequency components within a particular frequency band.

Aspect 13: The method of Aspect 12, wherein the preference is based at least in part on one or more of a frequency band used for access link communication with a base station, the channel conditions associated with the one or more frequency components in the first frequency band, the channel conditions associated with the one or more frequency components in the second frequency band, thermal overhead associated with one or more of the first frequency band or the second frequency band, or power consumption associated with one or more of the first frequency band or the second frequency band.

Aspect 14: The method of any of Aspects 1-13, wherein the first frequency band includes one or more frequencies in a first frequency range, and wherein the second frequency band includes one or more frequencies in a second frequency range.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   determining a set of frequency components to use in sidelink operation based at least in part on an inter-band carrier aggregation configuration, wherein the set of frequency components includes one or more frequency components in a first frequency band and one or more frequency components in a second frequency band; and
   communicating with another UE over a sidelink using one or more beams that are selected based at least in part on channel conditions associated with the one or more frequency components in the first frequency band and channel conditions associated with the one or more frequency components in the second frequency band.

2. The method of claim 1, wherein the one or more beams include a first beam associated with a first set of beam weights and a second beam associated with a second set of beam weights based at least in part on the channel conditions associated with the one or more frequency components in the first frequency band and the channel conditions associated with the one or more frequency components in the second frequency band.

3. The method of claim 2, wherein the first set of beam weights and the second set of beam weights are independently determined based at least in part on the UE and the other UE using different radio frequency chains to communicate over the sidelink in the first frequency band and the second frequency band.

4. The method of claim 2, wherein the first set of beam weights and the second set of beam weights are determined to mitigate performance loss in the first frequency band and the second frequency band based at least in part on the UE and the other UE using a common radio frequency chain to communicate over the sidelink in the first frequency band and the second frequency band.

5. The method of claim 2, wherein the first set of beam weights and the second set of beam weights are based at least in part on a first number of clusters in a channel of the first frequency band and a second number of clusters in a channel of the second frequency band.

6. The method of claim 1, wherein the one or more beams include only a beam associated with the first frequency band based at least in part on the channel conditions associated with the one or more frequency components in the second frequency band.

7. The method of claim 6, further comprising:
transmitting, to the other UE, a request to mute the second frequency band.

8. The method of claim 7, further comprising:
transmitting, to the other UE, a request to enable communication via the second frequency band based at least in part on a change in the channel conditions associated with the one or more frequency components in the second frequency band.

9. The method of claim 1, further comprising:
receiving, from a base station, information indicating the one or more beams to use to communicate with the other UE over the sidelink.

10. The method of claim 9, further comprising:
transmitting, to the base station, information indicating one or more candidate beams for the one or more frequency components in the first frequency band and the one or more frequency components in the second frequency band, wherein the one or more beams indicated by the base station are selected from the one or more candidate beams.

11. The method of claim 1, further comprising:
communicating with the other UE to autonomously select the one or more beams to use to communicate over the sidelink.

12. The method of claim 1, wherein the set of frequency components to use in sidelink operation is determined based at least in part on one or more of the UE or the other UE indicating a preference with respect to a particular frequency band or one or more frequency components within a particular frequency band.

13. The method of claim 12, wherein the preference is based at least in part on one or more of a frequency band used for access link communication with a base station, the channel conditions associated with the one or more frequency components in the first frequency band, the channel conditions associated with the one or more frequency components in the second frequency band, thermal overhead associated with one or more of the first frequency band or the second frequency band, or power consumption associated with one or more of the first frequency band or the second frequency band.

14. The method of claim 1, wherein the first frequency band includes one or more frequencies in a first frequency range, and wherein the second frequency band includes one or more frequencies in a second frequency range.

15. A user equipment (UE) for wireless communication, comprising:
a memory; and
one or more processors, coupled to the memory, configured to:
determine a set of frequency components to use in sidelink operation based at least in part on an inter-band carrier aggregation configuration, wherein the set of frequency components includes one or more frequency components in a first frequency band and one or more frequency components in a second frequency band; and
communicate with another UE over a sidelink using one or more beams that are selected based at least in part on channel conditions associated with the one or more frequency components in the first frequency band and channel conditions associated with the one or more frequency components in the second frequency band.

16. The UE of claim 15, wherein the one or more beams include a first beam associated with a first set of beam weights and a second beam associated with a second set of beam weights based at least in part on the channel conditions associated with the one or more frequency components in the first frequency band and the channel conditions associated with the one or more frequency components in the second frequency band.

17. The UE of claim 16, wherein the first set of beam weights and the second set of beam weights are independently determined based at least in part on the UE and the other UE using different radio frequency chains to communicate over the sidelink in the first frequency band and the second frequency band.

18. The UE of claim 16, wherein the first set of beam weights and the second set of beam weights are determined to mitigate performance loss in the first frequency band and the second frequency band based at least in part on the UE and the other UE using a common radio frequency chain to communicate over the sidelink in the first frequency band and the second frequency band.

19. The UE of claim 16, wherein the first set of beam weights and the second set of beam weights are based at least in part on a first number of clusters in a channel of the first frequency band and a second number of clusters in a channel of the second frequency band.

20. The UE of claim 15, wherein the one or more beams include only a beam associated with the first frequency band based at least in part on the channel conditions associated with the one or more frequency components in the second frequency band.

21. The UE of claim 20, wherein the one or more processors are further configured to:
transmit, to the other UE, a request to mute the second frequency band.

22. The UE of claim 21, wherein the one or more processors are further configured to:
transmit, to the other UE, a request to enable communication via the second frequency band based at least in part on a change in the channel conditions associated with the one or more frequency components in the second frequency band.

23. The UE of claim 15, wherein the one or more processors are further configured to:
receive, from a base station, information indicating the one or more beams to use to communicate with the other UE over the sidelink.

24. The UE of claim 23, wherein the one or more processors are further configured to:
transmit, to the base station, information indicating one or more candidate beams for the one or more frequency components in the first frequency band and the one or more frequency components in the second frequency band, wherein the one or more beams indicated by the base station are selected from the one or more candidate beams.

25. The UE of claim 15, wherein the one or more processors are further configured to:
communicate with the other UE to autonomously select the one or more beams to use to communicate over the sidelink.

26. The UE of claim 15, wherein the set of frequency components to use in sidelink operation is determined based at least in part on one or more of the UE or the other UE indicating a preference with respect to a particular frequency band or one or more frequency components within a particular frequency band.

27. The UE of claim 26, wherein the preference is based at least in part on one or more of a frequency band used for access link communication with a base station, the channel conditions associated with the one or more frequency components in the first frequency band, the channel conditions associated with the one or more frequency components in the second frequency band, thermal overhead associated with one or more of the first frequency band or the second frequency band, or power consumption associated with one or more of the first frequency band or the second frequency band.

28. The UE of claim 15, wherein the first frequency band includes one or more frequencies in a first frequency range, and wherein the second frequency band includes one or more frequencies in a second frequency range.

29. A non-transitory computer-readable medium storing a set of instructions for wireless communication, the set of instructions comprising:
one or more instructions that, when executed by one or more processors of a user equipment (UE), cause the UE to:
determine a set of frequency components to use in sidelink operation based at least in part on an inter-band carrier aggregation configuration, wherein the set of frequency components includes one or more frequency components in a first frequency band and one or more frequency components in a second frequency band; and
communicate with another UE over a sidelink using one or more beams that are selected based at least in part on channel conditions associated with the one or more frequency components in the first frequency band and channel conditions associated with the one or more frequency components in the second frequency band.

30. An apparatus for wireless communication, comprising:
means for determining a set of frequency components to use in sidelink operation based at least in part on an inter-band carrier aggregation configuration, wherein the set of frequency components includes one or more frequency components in a first frequency band and one or more frequency components in a second frequency band; and
means for communicating with a user equipment over a sidelink using one or more beams that are selected based at least in part on channel conditions associated with the one or more frequency components in the first frequency band and channel conditions associated with the one or more frequency components in the second frequency band.

* * * * *